(12) United States Patent
An et al.

(10) Patent No.: US 12,162,424 B2
(45) Date of Patent: Dec. 10, 2024

(54) AIRBAG INTEGRATED DISPLAY AND CONTROL METHOD FOR THE SAME

(71) Applicant: HYUNDAI MOBIS CO., LTD., Seoul (KR)

(72) Inventors: Hyun Jun An, Gunpo-si (KR); Shin Jik Lee, Hwaseong-si (KR); Jun Lee, Yongin-si (KR); Sung Joon Ahn, Seongnam-si (KR); Ji Soo Shin, Yongin-si (KR); Seok Hoon Ko, Yongin-si (KR); Kyung Hoon Kim, Yongin-si (KR); Jae Seong Cha, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/451,320

(22) Filed: Aug. 17, 2023

(65) Prior Publication Data

US 2024/0132010 A1  Apr. 25, 2024
US 2024/0227719 A9  Jul. 11, 2024

(30) Foreign Application Priority Data

Oct. 20, 2022  (KR) .......................... 10-2022-0135971
Oct. 20, 2022  (KR) .......................... 10-2022-0135972

(51) Int. Cl.
*B60R 21/263*  (2011.01)
*B60R 11/02*  (2006.01)
*B60R 21/205*  (2011.01)
*B60R 21/2338*  (2011.01)

(52) U.S. Cl.
CPC ........ *B60R 21/263* (2013.01); *B60R 11/0235* (2013.01); *B60R 21/205* (2013.01); *B60R 2021/23384* (2013.01); *B60R 2021/23388* (2013.01); *B60R 2021/2633* (2013.01)

(58) Field of Classification Search
CPC . B60R 21/263; B60R 21/2338; B60R 21/205; B60R 2021/2633; B60R 2021/23384; B60R 2021/23382; B60R 11/0229; B60R 11/0235
USPC ........................... 280/728.2, 732, 736, 743.2
See application file for complete search history.

(56) References Cited

U.S. PATENT DOCUMENTS

| 11,370,381 | B1 * | 6/2022 | Mihm ................... B60R 21/205 |
| 2016/0121805 | A1 * | 5/2016 | Forsgren ............. B60R 11/0235 348/837 |
| 2022/0024402 | A1 * | 1/2022 | Lee ........................ B60R 21/217 |
| 2022/0348159 | A1 * | 11/2022 | Mihm .................... B60K 35/00 |

FOREIGN PATENT DOCUMENTS

| CN | 115214472 A | * 10/2022 | ............. B60K 37/02 |
| DE | 102019206584 B3 | * 10/2020 | |

* cited by examiner

*Primary Examiner* — Keith J Frisby
(74) *Attorney, Agent, or Firm* — NSIP Law

(57) ABSTRACT

Disclosed are an airbag integrated moving display and a control method where the airbag-integrated display includes a display movable to a forward or rearward position according to a driving mode of a vehicle, and an airbag mounted to the rear of the display and being configured to move along with a movement of the display, and vary a level of inflation of the airbag based on at least one of a position of the display or a distance from a driver of the vehicle.

20 Claims, 14 Drawing Sheets

910

910

AIRBAG INTEGRATED DISPLAY AND CONTROL METHOD FOR THE SAME

CROSS REFERENCE TO RELATED APPLICATION

This application claims the benefit under 35 U.S.C. § 119(a) of Korean Patent Application Nos. 10-2022-0135971 and 10-2022-0135972, filed on Oct. 20, 2022, the entire disclosure of which are incorporated by reference for all purposes.

BACKGROUND

1. Field

The following description relates to an airbag-integrated display and a control method for the same, and more particularly, to a display implemented by integrating an airbag into a display movable forward or backward according to a driving mode of a mobility apparatus and a control method for the same.

2. Discussion of Related Art

With the advent of autonomous vehicles, various studies have been conducted on how to improve occupant comfort. For example, it has been proposed to improve the visibility and convenience of occupants by moving the position of the display left/right or up/down depending on the driving mode. Also, in an autonomous driving mode, a retractable steering wheel has been proposed to allow an occupant to move more freely.

However, in the case where the display is moved left/right or up/down, the distance between the occupant and the display is maintained, which limits the visibility of the occupant. In addition, in the related art, the movement of the display and the retractable implementation of the steering wheel may affect the inflation of the airbag.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an airbag-integrated display including a display movable to a forward or rearward position according to a driving mode of a vehicle, and an airbag mounted to the rear of the display and being configured to move along with a movement of the display, and vary a level of inflation of the airbag based on at least one of a position of the display or a distance from a driver of the vehicle.

A volume of inflation of the airbag may be lesser than a threshold, in response to the display being in the forward position, the volume of inflation of the airbag may be greater than the threshold, in response to the display being in the rearward position.

A volume of inflation of the airbag may be lesser than a threshold, in response to the display being in the forward position and a seat of the driver not being reclined, the volume of inflation of the airbag may be greater than the threshold, in response to the display being in the rearward position or the display being in the forward position and the seat of the driver being reclined.

The airbag may include a first tether having a first length and a second tether having a length greater than the first length, the first tether and second tether being disposed inside a cushion, wherein at least one of the first tether or the second tether may be configured to be broken sequentially, based on the at least one of the position of the display or the distance from the driver of the vehicle.

The airbag may be configured to maintain the first tether and the second tether, in response to the position of the display or the distance from the driver of the vehicle being within a first range, the airbag may be configured to break the first tether, in response to the position of the display or the distance from the driver of the vehicle being within a second range larger than the first range, and the airbag may be configured to break both the first tether and the second tether, in response to the position of the display or the distance from the driver of the vehicle being within a third range larger than the second range.

The airbag may include an inflator, and an active adaptive unit (AAU), wherein the AAU may be configured to sequentially break at least one of the first tether or the second tether, based on the at least one of the position of the display or the distance from the driver of the vehicle.

The airbag-integrated display may include rails, an actuator, and a gear being provided at a rear of the display for forward or backward movement of the display.

A thickness of the airbag may be less than or equal to a predetermined thickness sufficient to provide installation space for a head-up display (HUD) in a cover section of the rails.

The gear and the actuator may be disposed at a position that may be offset from a center of the display, the airbag not being disposed at the offset position.

The airbag-integrated display may include a position sensor arranged at the rear of the display according to a side on which the gear may be disposed, wherein the actuator may be configured to control a motor drive of the actuator based on the position sensor.

The vehicle may be an autonomous vehicle, the display may be moved from an initial position to a forwardly pulled-out position, in response to the autonomous vehicle being in an autonomous driving mode, and the display may be moved rearward from the pulled-out position to the initial position, in response to the autonomous vehicle being in a manual driving mode.

The display may be configured to return to the initial position or the pulled-out position, in response to an obstacle being detected during forward or rearward movement of the display.

A steering wheel of the autonomous vehicle may be accommodated in a storage space below the display, in response to the autonomous vehicle being in an autonomous driving mode.

Detection of the obstacle may be determined based on whether a current in the motor of the actuator is greater than or equal to a predetermined threshold.

The mobility apparatus may further include an in-cabin monitoring camera, wherein the in-cabin monitoring camera may be configured to determine the distance from the driver of the mobility apparatus.

The mobility apparatus may be a manually operated vehicle. When the manually operated vehicle is stationary and the driver is watching the display, the display may be moved to be pulled forward.

In another general aspect, there is provided a processor-implemented method of controlling an airbag-integrated display, the method including moving a display forward or rearward based on a driving mode of a vehicle, determining at least one of a position of the display or a distance of the display from a driver of the vehicle, and applying a different level of inflation of an airbag mounted to the rear of the display based on the at least one of the position of the display or the distance of the display from the driver of the vehicle, the airbag being moved along with a movement of the display.

The applying of the different level of inflation may include inflating the airbag with a volume lesser than a threshold, in response to the display being in a forward position, and inflating the airbag with a volume greater than the threshold, in response to the display being in a rearward position.

The applying of the different level of inflation may include inflating the airbag with a volume lesser than a threshold, in response to the display being in a forward position and a seat of the driver not being reclined, and inflating the airbag with a volume greater than the threshold, in response to the display being in a rearward position or the display being in the forward position and the seat of the driver being reclined.

The airbag may include a first tether having a first length and a second tether having a length greater than the first length, the first tether and second tether being disposed inside a cushion, wherein the applying of the different level of inflation may include sequentially breaking at least one of the first tether or the second tether based on the at least one of the position of the display or the distance from the driver.

The applying of the different level of inflation may include maintaining the first tether and the second tether, in response to the position of the display or the distance from the driver of the vehicle being within a first range, breaking the first tether, in response to the position of the display or the distance from the driver of the vehicle being within a second range larger than the first range, and breaking both the first tether and the second tether, in response to the position of the display or the distance from the driver of the vehicle being within a third range larger than the second range.

The sequential breaking of the at least one of the first tether or the second tether may be performed by an active adaptive unit (AAU) of the airbag.

The vehicle may be an autonomous vehicle, wherein the moving of the display forward or rearward may include moving the display from an initial position to a forwardly pulled-out position, in response to the autonomous vehicle being in an autonomous driving mode, and moving the display rearward from the pulled-out position to the initial position, in response to the autonomous vehicle being in a manual driving mode.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

Figure 1:
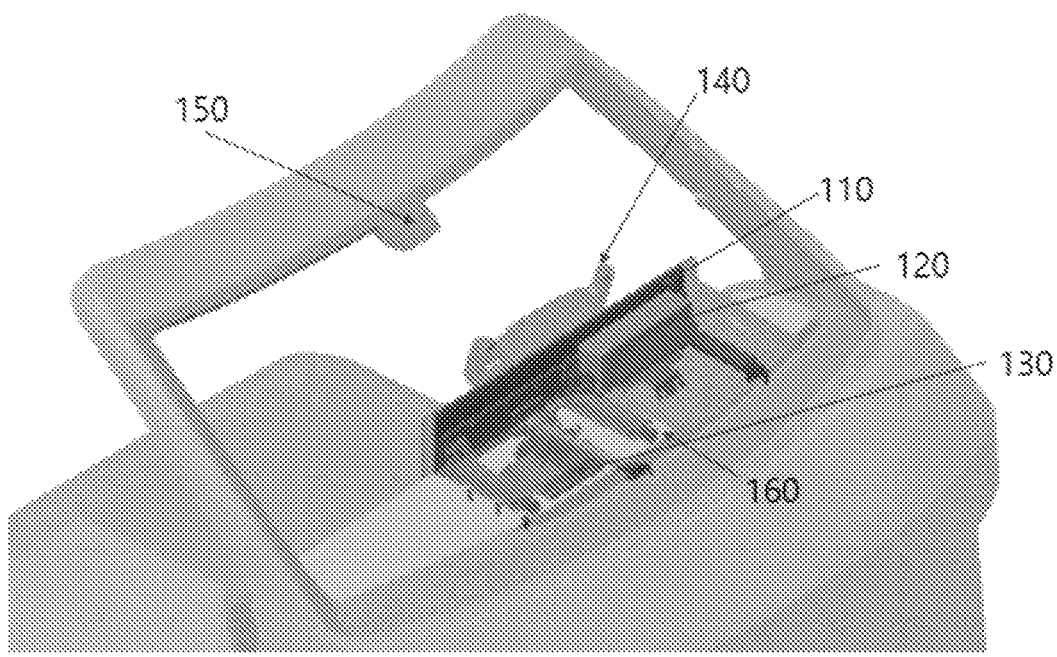
FIG. 1 is a view illustrating a configuration of an airbag-integrated moving display according to one embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE DISCLOSURE

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, whenever any part is described as "including" any component, it is meant to be inclusive of other components, not exclusive of other components, unless explicitly stated otherwise.

Also, as used in the following description, a vehicle, which may also be referred to as a mobility apparatus, refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, bicycle, walking assist device (WAD), robot, drone, bicycle, urban air mobility (UAM), smart mobility, autonomous vehicle, unmanned aerial vehicle, and flying object such as an airplane. In some examples, the vehicle or the mobility apparatus may be, for example, an autonomous vehicle, a smart mobility, an electric vehicle, an intelligent vehicle, an electric vehicle (EV), a plug-in hybrid EV (PHEV), a hybrid EV (HEV), or a hybrid vehicle, an intelligent vehicle equipped with an advanced driver assistance system (ADAS) and/or an autonomous driving (AD) system.

In some examples, the autonomous vehicle may be controlled by an onboard computer system that uses algorithms, machine learning, and other artificial intelligence techniques to interpret the sensor data and to make decisions based on that information. The computer system can control the vehicle's speed, direction, acceleration, and braking, as well as other systems such as lighting, heating, safety, and air conditioning. In some examples, the autonomous vehicle may be equipped with communication technologies to interact with other vehicles, infrastructure, and/or a central control system(s). The autonomous vehicle may operate in various modes, such as, for example, fully autonomous, semi-autonomous, and remote control where it is controlled by the central control system(s).

FIG. 1 is a view illustrating a configuration of an airbag-integrated moving display according to one embodiment of the present disclosure.

The airbag-integrated moving display illustrated in FIG. 1 may include a display 110 movable to a forward or rearward position depending on the driving mode of the mobility apparatus, and a slim airbag 120 integrally mounted to the rear of the display 110, which moves along with the movement of the display 110.

The forward or backward movement of the display 110 may be implemented by rails and a gear module 130, as will be described later. One embodiment of the present disclosure proposes using an odd number of rails to provide stability during inflation of the slim airbag 120 at the rear of the display 100 that is movable forward or backward. While the example of FIG. 1 shows three rails, embodiments are not necessarily limited thereto.

When an odd number of rails are used, it is proposed that the gear module 130 be positioned on one of the left and right sides (in FIG. 1, the right side from the driver's perspective) of the centrally located rail 160 to provide a driving force for forward or backward movement of the display 110. In contrast, the slim airbag 120 is proposed to be disposed on the other side (in FIG. 1, the left side from the driver's perspective) of the centrally located rail 160 to provide safety to the driver when the airbag is inflated. In other words, the display 110 of this embodiment may be a large display that can be operated from the driver's seat as well as the front passenger seat. Additionally, the slim airbag 120 may have a thickness less than or equal to a predetermined thickness to allow space for placement of other components (e.g., a HUD).

The mobility apparatus illustrated in FIG. 1 may further include an in-cabin monitoring camera 150. The in-cabin monitoring camera 150 may be configured to determine the distance from the driver of the mobility apparatus, and may be used to control the level of inflation of the airbag based on the distance from the driver, as will be described later.

Figure 2A:
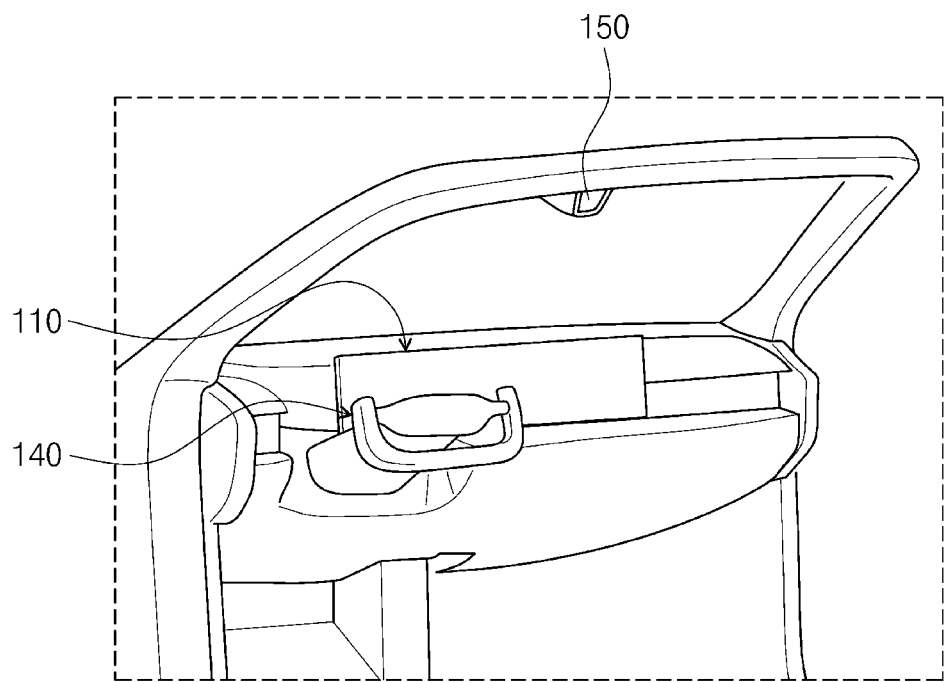
FIGS. 2A and 2B are views illustrating a setting change according to a driving mode of a mobility apparatus according to one embodiment of the present disclosure.
Figure 2B:
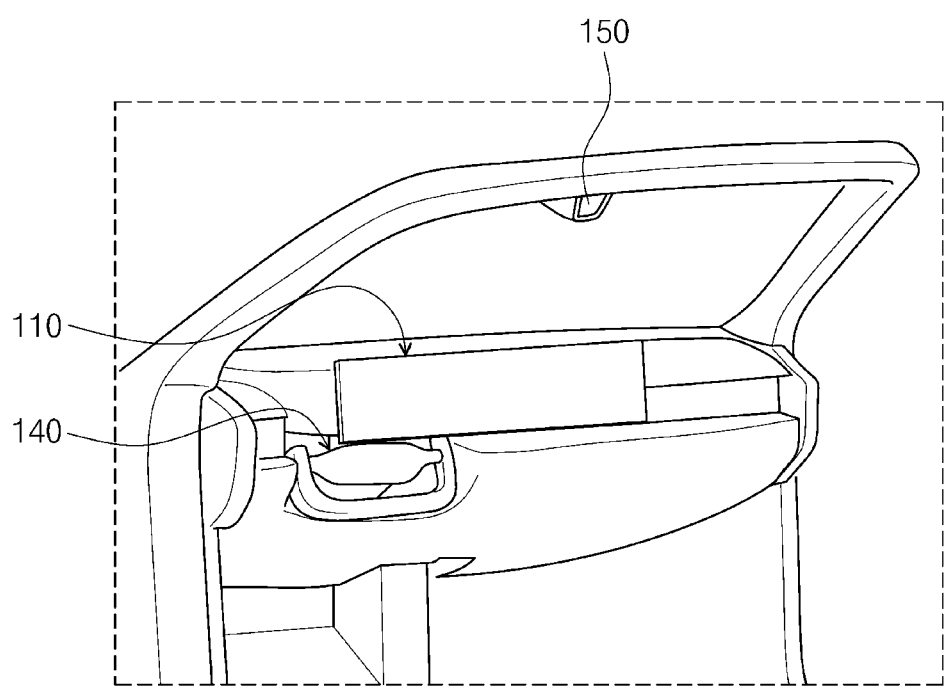

FIGS. 2A and 2B are views illustrating a setting change according to a driving mode of a mobility apparatus according to one embodiment of the present disclosure.

In one embodiment of the present disclosure, the mobility apparatus described above is an autonomous vehicle. FIG. 2A illustrates the autonomous vehicle operating in a manual driving mode, and FIG. 2B illustrates the autonomous vehicle operating in an autonomous driving mode.

When the autonomous vehicle is operating in the autonomous driving mode (FIG. 2B), the display 110 may be moved to be extended further forward than when the autonomous vehicle is operating in the manual driving mode (FIG. 2A). It is assumed that the steering wheel 140 of the autonomous vehicle is accommodated in a storage space below the display 110. Unlike conventional structures where the airbag is disposed at the rear of the steering wheel, the airbag-integrated display according to the above-described embodiment allows for freedom in the design of the steering wheel 140 while minimizing the impact on stability related to the airbag. In the example of FIGS. 1 and 2A-2B, it is assumed that the steering wheel is implemented with a steer by wire type steering column so as to be repositionable depending on the driving mode of the mobility apparatus.

The in-cabin camera 150 shown in FIGS. 2A and 2B may be configured to not only measure the distance to the driver, but also to determine the distance between the driver and the display 110, which may move forward or backward depending on the driving mode.

Figure 3:
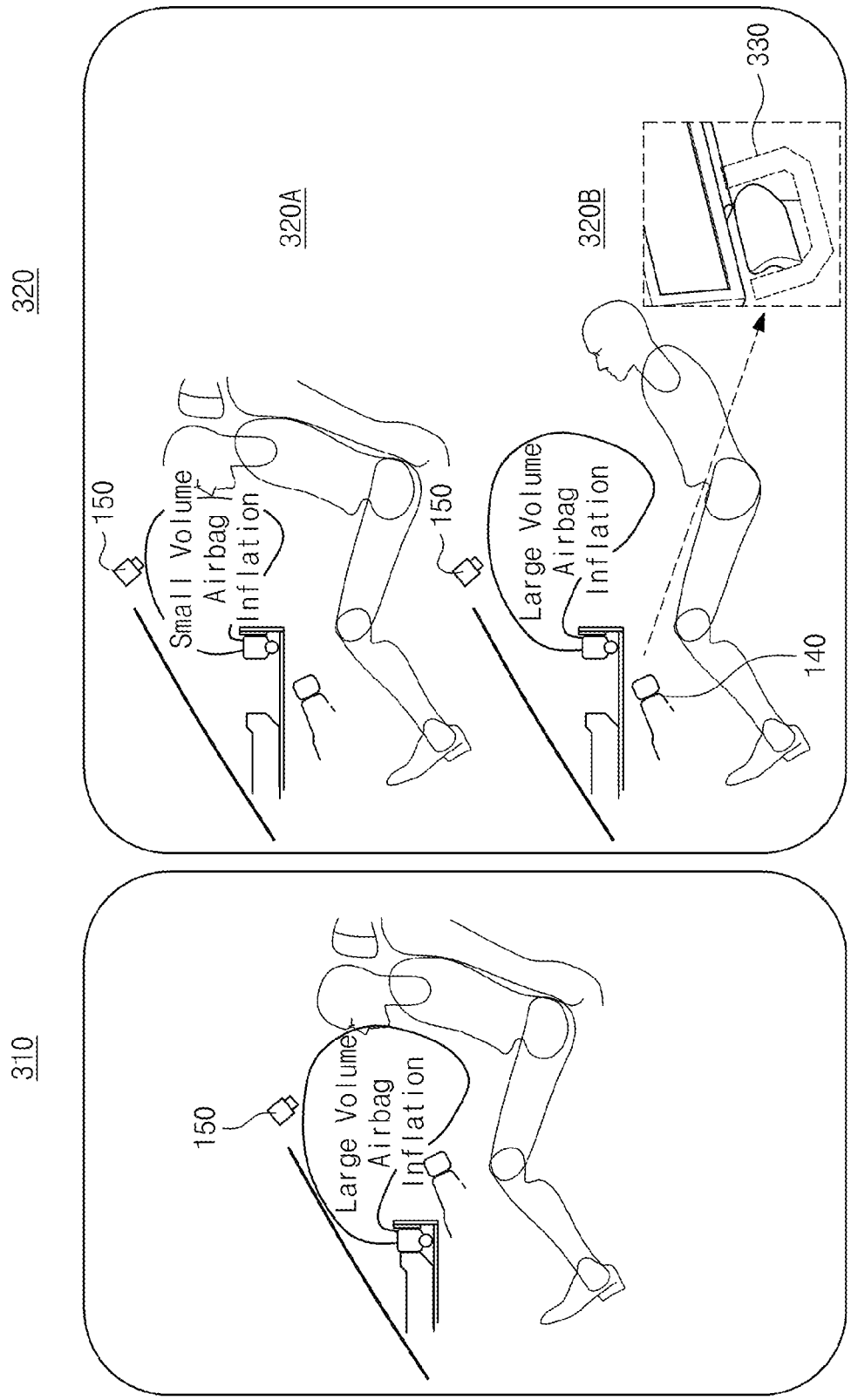
FIG. 3 is a view illustrating varying the level of inflation of an airbag according to one embodiment of the present disclosure.

FIG. 3 is a view illustrating varying the level of inflation of an airbag according to one embodiment of the present disclosure.

In FIG. 3, the left part 310 illustrates a case where the mobility apparatus is operating in the manual driving mode, and the right part 320 illustrates a case where the mobility apparatus is operating in the autonomous driving mode.

In this embodiment, it is proposed that the slim airbag be configured to vary the level of inflation of the airbag based on at least one of the position of the display or the distance from the driver of the mobility apparatus. For example, in the manual driving mode 310, the display (airbag) is positioned to the rear, away from the driver, and therefore it is proposed that a high inflation level of the airbag is applied to apply a large volume of airbag inflation. On the other hand, in the autonomous driving mode 320 shown on the right side of FIG. 3, in the mode 320A (hereinafter referred to as "entertainment mode") in which the driver watches the display, the display (airbag) is protruding toward the driver, and therefore, it is proposed that a low inflation level of the airbag is applied to apply a small volume of airbag inflation.

The embodiment of FIG. 3 proposes not only to vary the level of airbag inflation depending on the driving mode, such as autonomous driving mode/manual driving mode, as described above (depending on the position of the display), but also to vary the level of airbag inflation depending on the position of the driver. For example, even in the autonomous driving mode 320, when the driver is not watching the display and the seat is in a reclined mode (hereinafter referred to as "relaxation mode"), the display is in a protruded state, but a large volume of airbag inflation may be applied due to the long distance between the display (airbag) and the driver.

In addition, in FIG. 3, a yoke-type steering wheel 330 is applied as the steering wheel, and it is proposed that a steering storage space be secured at the bottom of the moving monitor.

While FIGS. 2A-2B and 3 illustrate the forward or backward movement of the display and the corresponding control of the level of inflation of the airbag based on an example where the mobility apparatus is an autonomous vehicle, the above-described method is also applicable when the mobility apparatus is a manually operated vehicle. For example, when a driver of the manually operated vehicle is watching the display while the vehicle is stationary, the display may be moved to extend toward the driver. In response to this forward or backward movement, the level of inflation of the airbag integrated with the display may be controlled as described above.

Figure 4:
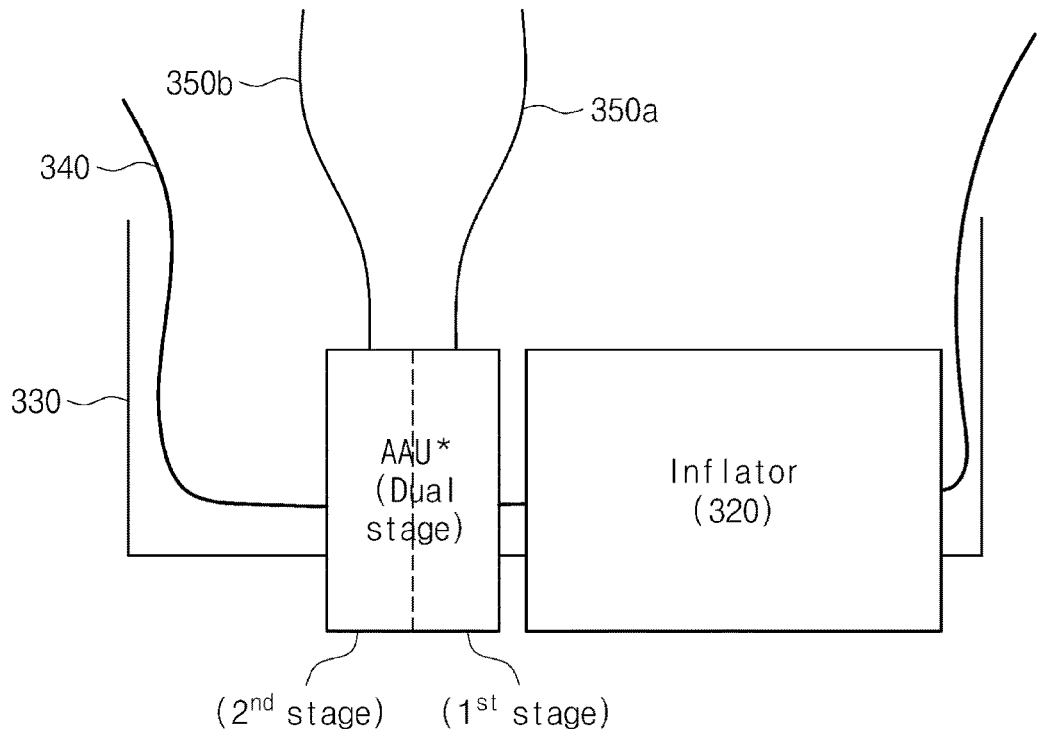
FIG. 4 is a diagram illustrating a configuration of an airbag according to one embodiment of the present disclosure.

FIG. 4 is a diagram illustrating a configuration of an airbag according to one embodiment of the present disclosure.

In the example illustrated in FIG. 4, the airbag may include an active adaptive unit (AAU) 310 and an inflator 320. The AAU 310 is configured to adjust the means of inflation of the airbag in stages, based on at least one of the position of the display or the distance from the driver of the mobility apparatus. While FIG. 4 illustrates an example where the level of airbag inflation is controlled in two stages, such as a first stage/second stage, as in the example of FIG. 3, the stages of airbag inflation may be subdivided further as will be described below. The AAU 310 may control the inflation level by controlling the inflator 320, or may control the inflation level of the airbag by breaking tethers 350a and 350b inside the cushion 340 in stages, or may use a combination of both. Specifically, the AAU may be operated by an electrical signal and implemented to selectively break the tethers 350a and 350b when given an electrical signal.

The airbag illustrated in FIG. 4 includes a cushion 340 inside a housing 330, and may include a first tether 350a and a second tether 350b inside the cushion 340.

Figure 5:
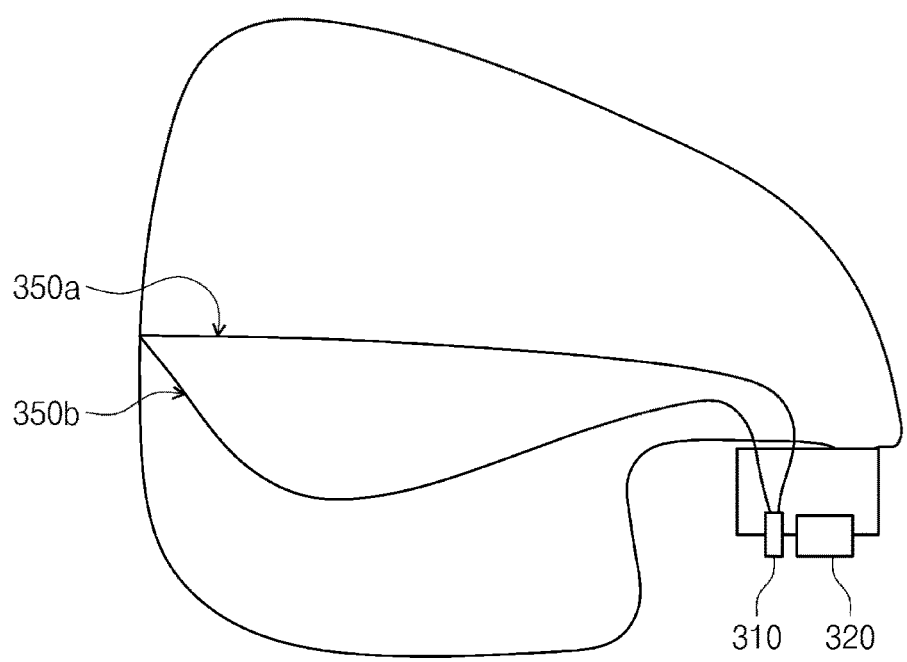
FIG. 5 is a view specifically illustrating the interior of the cushion of the airbag illustrated in FIG. 4.

FIG. 5 is a view specifically illustrating the interior of a cushion of the airbag illustrated in FIG. 4.

As described above, the interior of the cushion includes the first tether 350a and the second tether 350b, and it is proposed that the first tether 350a be configured to be short in length and the second tether 350b to be long in length. In the following description, the length of the first tether 350a will be referred to as a "first length" and the length of the second tether 350b will be referred to as a "second length" that is greater than the first length.

It is proposed that the AAU 310 according to this embodiment is configured to break at least one of the first tether 350a or the second tether 350b in stages, based on one or more of the position of the display or the distance from the driver of the mobility apparatus.

Figure 6:
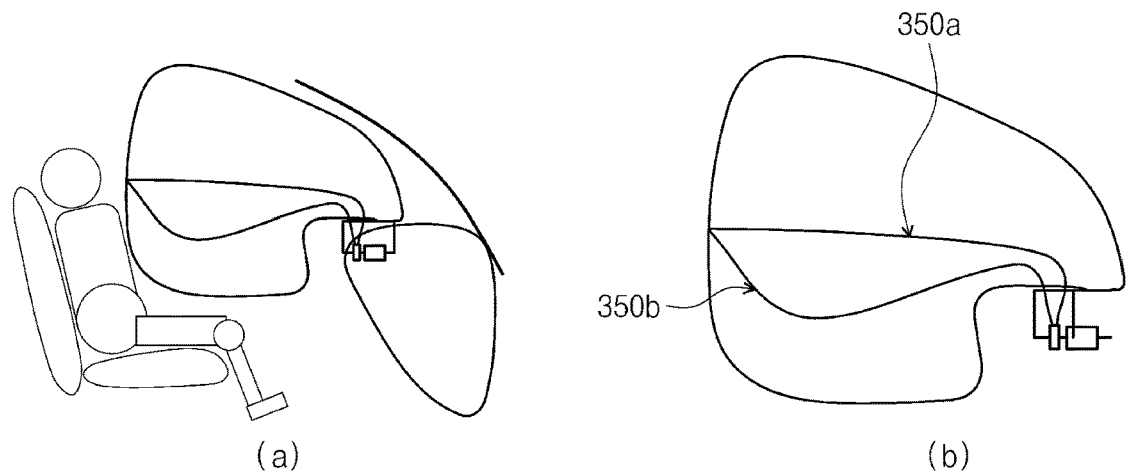
FIGS. 6 to 8 are views illustrating step-by-step inflation of an airbag according to one embodiment of the present disclosure.
Figure 7:
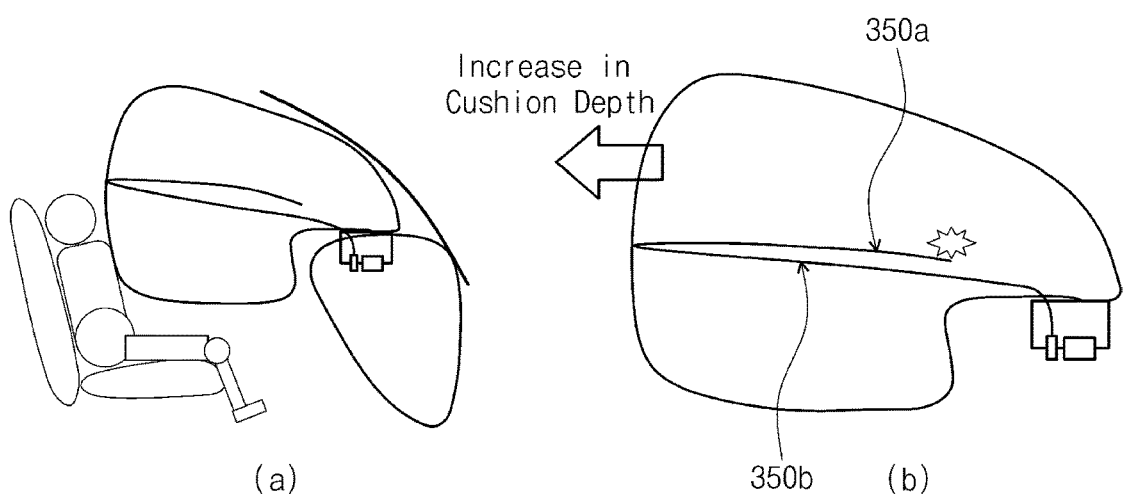
Figure 8:
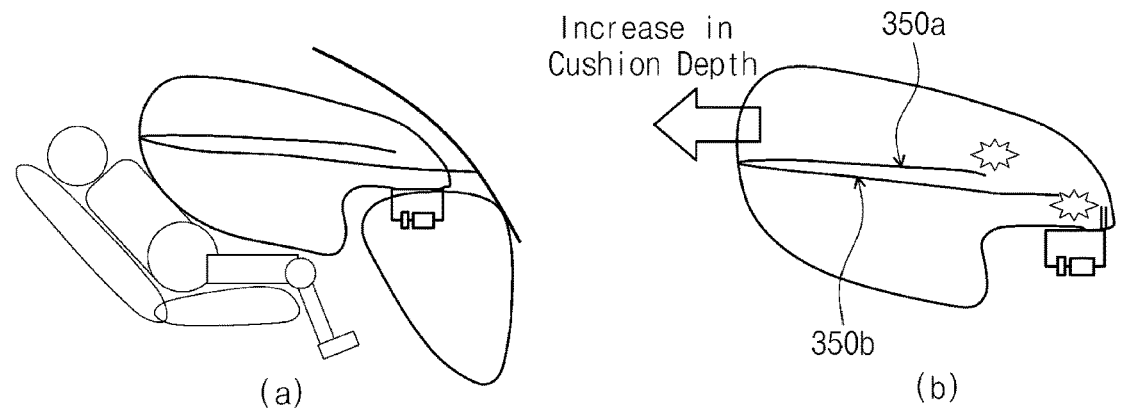

FIGS. 6 to 8 are views illustrating step-by-step inflation of an airbag according to one embodiment of the present disclosure.

Illustration (a) of FIG. 6 illustrates a case where an impact is detected and the airbag is inflated while the display (airbag) is positioned protruding toward the driver in the autonomous driving mode. In this case, as shown in illustration (b) of FIG. 6, the slim airbag may be inflated by an inflator while maintaining both the first tether 350a and the second tether 350b, as it is determined that the position of the display or the distance from the driver of the mobility apparatus is within a first range. Accordingly, the airbag may be inflated in a small volume.

FIG. 7A illustrates a case where an impact is detected and the airbag is inflated in a normal driving mode while the display (airbag) is positioned retracted away from the driver. In this case, as shown in FIG. 7B, the slim airbag may determine that the position of the display or the distance from the driver of the mobility apparatus is within a second range larger than the first range of FIG. 6, and thus may break the first tether 350a between the first tether 350a and the second tether 350b. When the inflator is driven with the first tether 350a broken, the depth of the cushion may be increased, as shown in FIG. 7B, to provide safety for the driver located at a farther distance.

While illustration (a) of FIG. 7 may be described as being based on the position of the display (airbag) in the normal driving mode as described above, it may also be viewed as being based on the distance from the driver regardless of the driving mode, as in the case of a short passenger.

FIG. 8A illustrates a case where an impact is detected and the airbag is inflated in the relaxation mode in which the driver's seat is reclined in the autonomous mode. In this case, as shown in FIG. 8B, the slim airbag may break both the first tether 350a and the second tether 350b, based on determining that the position of the display or the distance from the driver of the mobility apparatus is within a third range larger than the second range. When the inflator is driven with both the first tether 350a and the second tether 350b broken as in this case, the depth of the cushion may be increased further than in the cases of FIGS. 6 and 7.

Illustration (a) of FIG. 8 describes an example of a driver's relaxation mode as described above, but it may also be applied as the distance to the driver recognized through the in-car camera is determined to be in the third range due to the driver's physical condition, or the like, regardless of the driving mode as described above.

In addition, while the inflation of the airbag is illustrated as being performed in two or three stages in the embodiments described above, but it may be further subdivided depending on the type of driving mode of the mobility apparatus, or the like.

Figure 9:
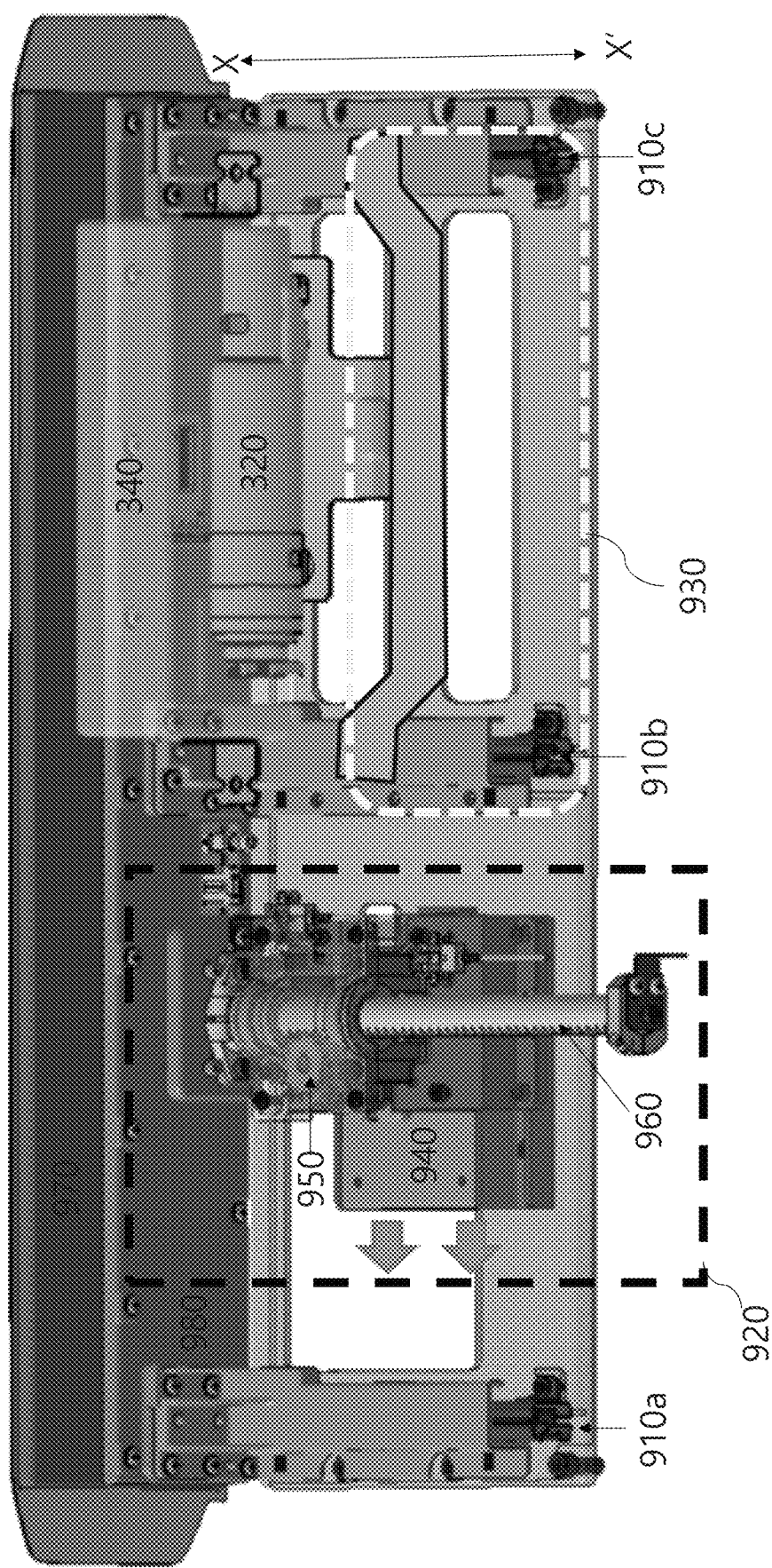
FIG. 9 is a view illustrating a specific configuration of an airbag integrated display according to one embodiment of the present disclosure.

FIG. 9 is a view illustrating a specific configuration of an airbag integrated display according to one embodiment of the present disclosure.

The airbag integrated moving display according to one embodiment of the present disclosure may include a first rear support 970 and a second rear support 980 at the rear of the display, such that components for forward or backward movement of the display are arranged at the rear.

First, for a slim airbag that is integrally mounted to the rear of the display and is repositioned according to the movement of the display, the cushion 340 and inflator 320 may be mounted to the rear of the display, as shown in FIG. 9.

It is also proposed to include an odd number of rails 910a, 910b, and 910c arranged at the rear of the display for forward or backward movement of the display. In the example of FIG. 9, three rails 910a, 910b, and 910c are illustrated.

One of the left and right sides of the rail 910b, which is positioned in the center of the odd number of rails 910a, 910b, and 910c, may include a gear module 920. FIG. 9 illustrates a configuration in which the gear module 920 is disposed on the left side and the slim airbag 320, 340 is disposed on the right side in the illustrated orientation.

The gear module 920 may include a rack gear 960, a pinion gear 950, and an actuator 940, and may provide a driving force for forward or backward movement of the display through the rack gear 960 and the pinion gear 950 based on a motor drive of the actuator 940.

It is proposed that the actuator 940 be disposed at the lower end of the rack gear 960 and pinion gear 950, primarily for space efficiency, but also for ease of after-sales service of the actuator 940, as will be described below.

In one preferred embodiment of the present disclosure, the slim airbag 320, 340 is limited to having a thickness less than or equal to a predetermined thickness that allows for installation space 930 for the head up display (HUD) within the cover section X-X' of the rails 910.

Furthermore, it is proposed that two position sensors be provided to check the forward or backward movement position of the moving display to precisely control the movement of the moving display.

Figure 10:
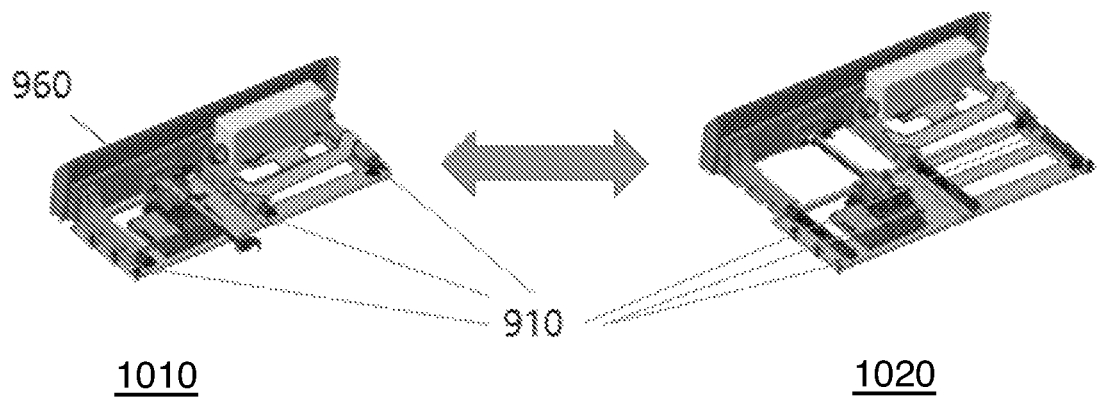
FIG. 10 is a view illustrating the mechanism of forward or backward movement of an airbag-integrated moving display, according to one embodiment of the present disclosure.

FIG. 10 is a view illustrating the mechanism of forward or backward movement of an airbag-integrated moving display, according to one embodiment of the present disclosure.

Configuration 1010 of FIG. 10 is a configuration in which the display is positioned retracted away from the driver, as in the case where the mobility apparatus is in the manual driving mode, and configuration 1020 of FIG. 10 is a configuration in which the display is positioned protruding toward the driver, as in the case where the mobility apparatus is in the autonomous driving mode.

When the display is positioned retracted as shown in configuration 1010, the rails 910 are arranged nested in the rail cover. When the display protrudes forward as shown in configuration 1020, the rails 910 are arranged to protrude out of the rail cover.

On the other hand, the rack gear 960 may push or pull the display through engagement with the pinion gear, according to the driving of the actuator, to implement the movement of the display.

Figure 11:
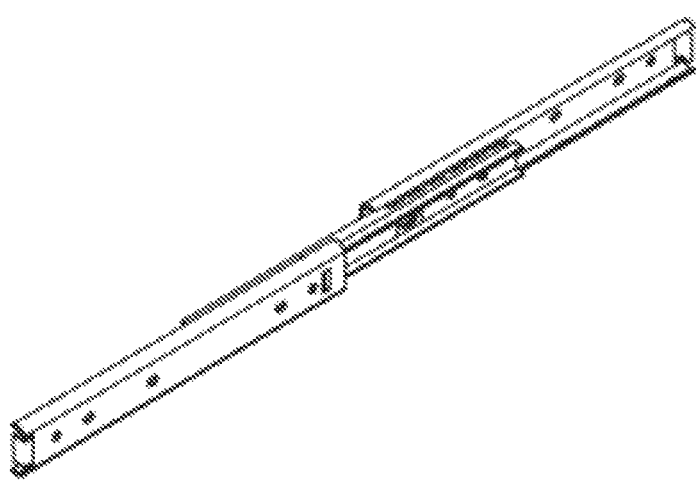
FIGS. 11 and 12 are views illustrating a rail structure used when the moving display moves as shown in FIG. 9.
Figure 12:
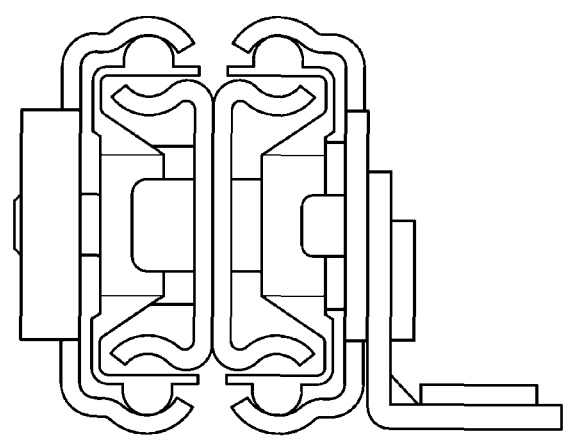

FIGS. 11 and 12 are views illustrating a rail structure used when the moving display moves as shown in FIG. 10.

As in the embodiment shown in FIGS. 11 and 12, the rails 910 are proposed to be of a three-stage double slide type, which allows the rails 910 to have sufficient rigidity for the inflation of the slim airbag, including an overlap section as shown in FIG. 11, after the pull-out is completed. FIG. 12 is a diagram illustrating the arrangement of the rails of the above-described three-stage double slide type in the overlapping position.

As described above, when the rails 910 are pulled out, the moving display is moved forward, which corresponds to a situation where the slim airbag is inflated in a large volume. Therefore, it is necessary to have sufficient rigidity to support such a large-volume airbag inflation. To this end, a structure capable of sufficiently including the overlap section even when the rails are pulled out is proposed.

Figure 13:
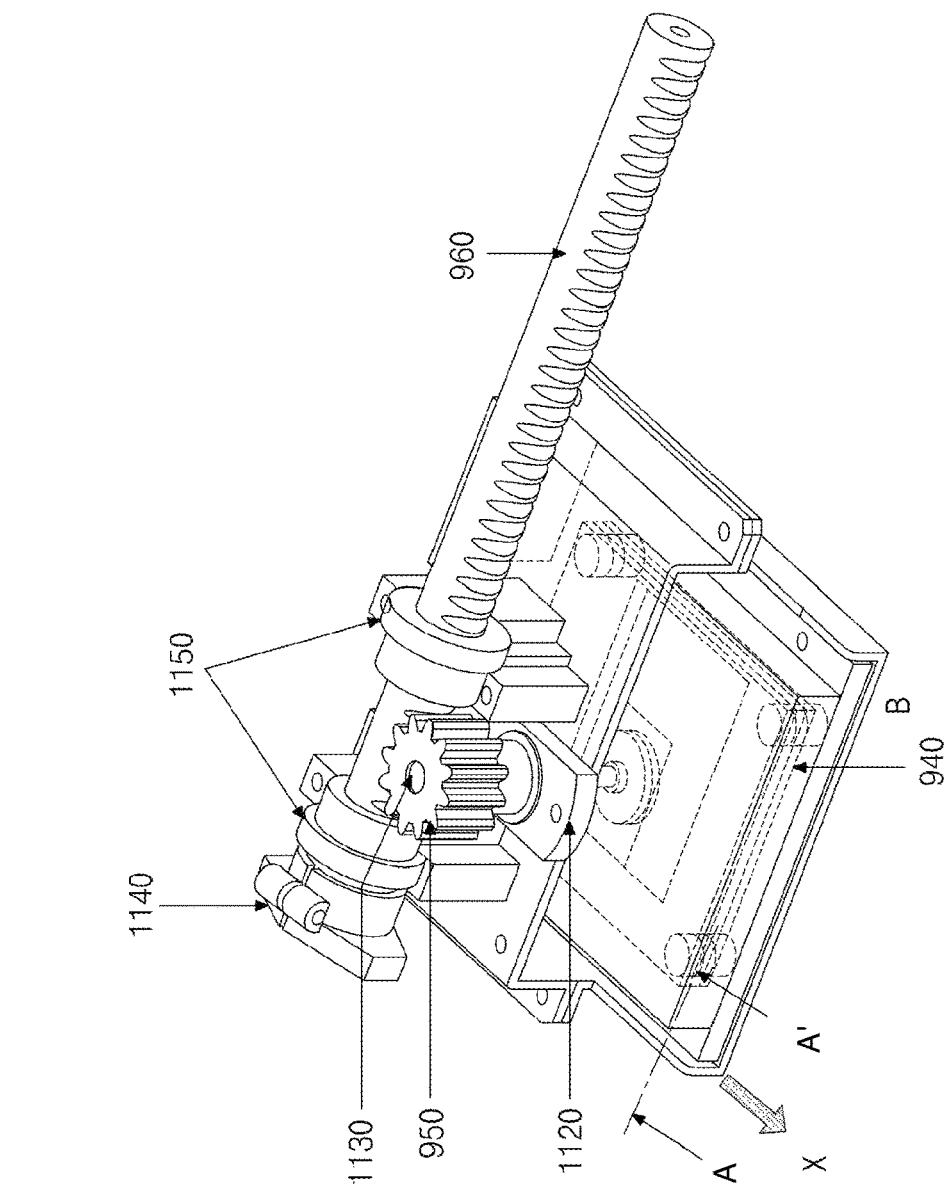
FIG. 13 is a view illustrating a structure for securing the convenience of after-sales service of an actuator according to one embodiment of the present disclosure.
Figure 13:
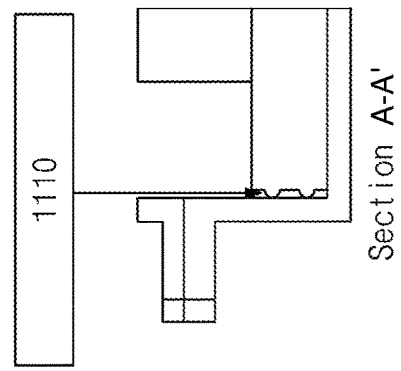

FIG. 13 is a view illustrating a structure for securing the convenience of after-sales service of an actuator according to one embodiment of the present disclosure.

The actuator 940 of the gear module 920 shown in FIG. 13 may include a motor, a reduction gear, and a controller configured in an integrated manner. The actuator 940 according to this embodiment may be disposed to be further manually movable in a direction away from the center rail (direction B in FIG. 13). Thereby, a space may be reserved for after-sales service work in the event of a failure of the actuator 940 or the like. Furthermore, the actuator 940 may include a line contact 1110 with the frame in a direction for further manual movement in the direction B. In FIG. 13, a cross-sectional view taken along A-A' is shown at the bottom left, illustrating an exemplary shape of the line contact 1110 described above. However, the specific shape of the line contact 1110 is not necessarily limited thereto.

As described above, in the event of a failure of the actuator 940, the pinion gear 950 may be configured to move in the direction of manual movement of the actuator 940. Thereby, in the event of the failure of the actuator 940, the pinion gear 950 may be disengaged from the rack gear 960 to prevent the transmission of driving force.

The driving force of the actuator 940 is transmitted to the pinion gear 950 via a shaft 1130, and a bearing holder 1120 may be positioned between the actuator 940 and the pinion gear 950. Rotation of the pinion gear 950 induces forward or backward movement of the rack gear 960, and a guide bush 1150 to support movement of the rack gear 960 may be provided. In the illustrated example, a circular rack gear holder 1140 is formed in a flange shape at one end of the rack gear 960.

Figure 14A:
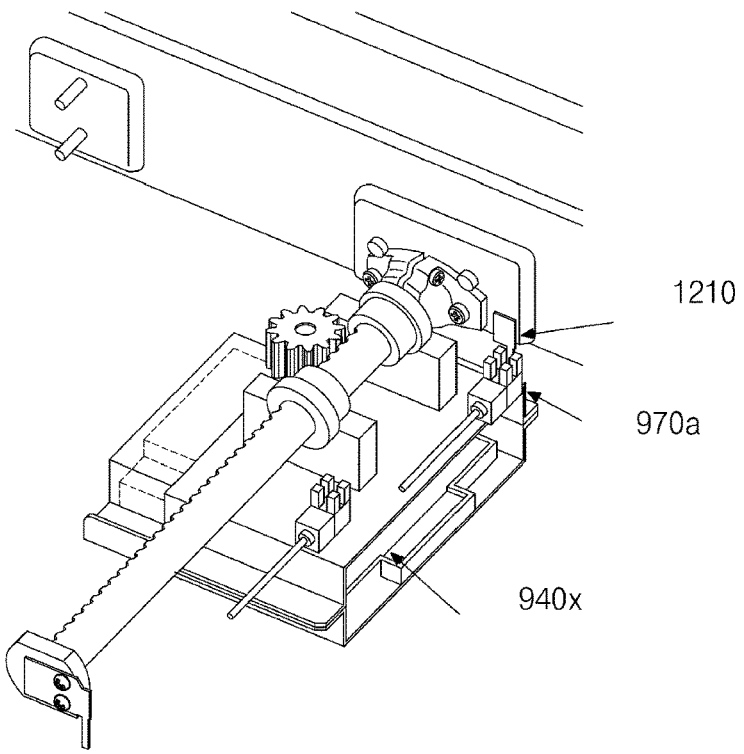
FIGS. 14A and 14B are views illustrating a structure for controlling the position of a moving display when the moving display is moved forward or backward, according to one embodiment of the present disclosure.
Figure 14B:
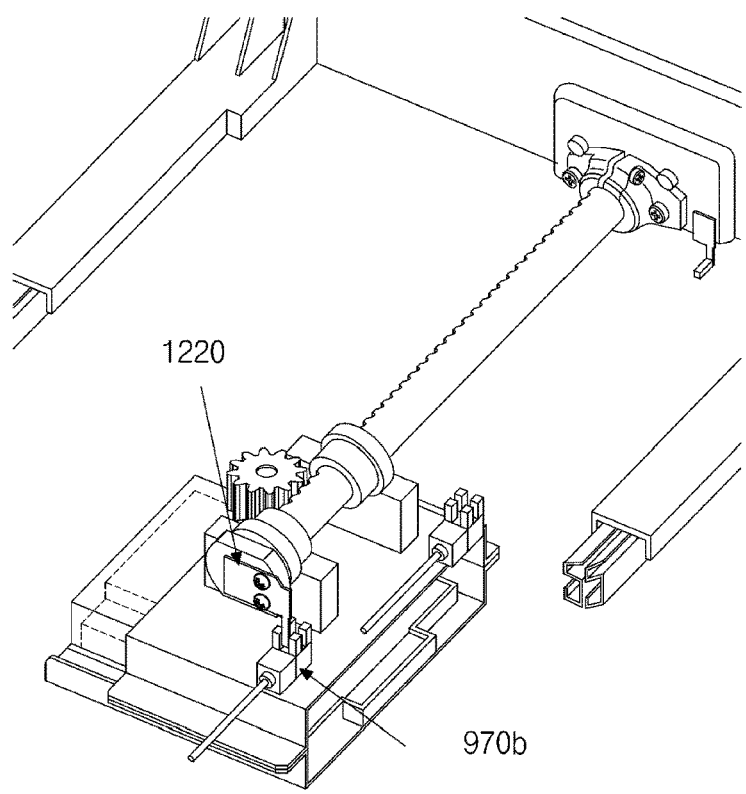

FIGS. 14A and 14B are views illustrating a structure for controlling the position of a moving display when the moving display is moved forward or backward, according to one embodiment of the present disclosure.

As described above, the actuator may include a motor, a reduction gear, and a controller 940x in an integrated manner, and it is proposed that the controller 940x of the actuator be controlled to drive the motor through a first photo sensor 970b disposed at a foremost position of the display and a second photo sensor 970a disposed at a rearmost position.

Furthermore, the embodiment shown in FIGS. 14A and 14B proposes to include guide pins 1210 and 1220 at the lower end of the display for the positional identification by the first photo sensor 970b and the second photo sensor 970a. In other words, the photo sensors 970a and 970b may recognize the guide pins 1210 and 1220, thereby accurately recognizing the foremost/rearmost position of the movement. A Hall sensor may be additionally provided inside the motor of the actuator. The Hall sensor may assist in the sensing operation in the event of a failure of one or more of the first photo sensor 970b or the second photo sensor 970a. That is, even when the photo sensors 970a and 970b are not operating due to a failure, the protrusion/retraction status of the display (airbag) may be determined using the Hall sensor inside the motor. When the photo sensors 970a and 970b are operating normally, the Hall sensor may still be used as a means to assist in the sensing of the photo sensors 970a and 970b for accuracy.

Figure 15:
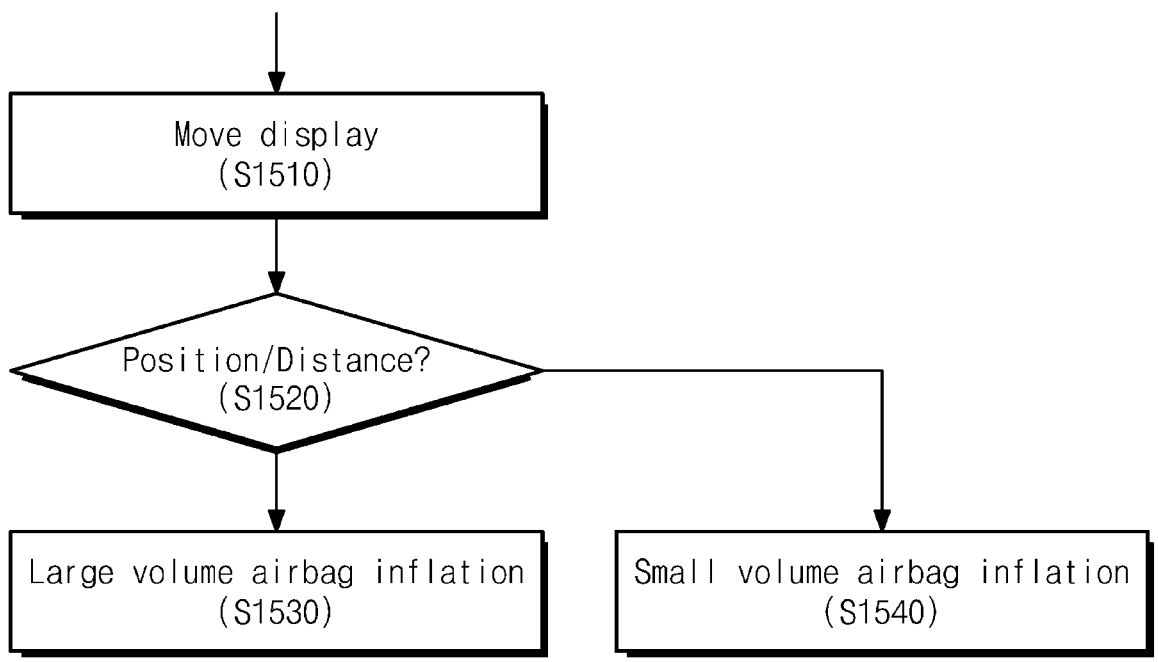
FIGS. 15 and 16 are flowcharts illustrating a method of controlling an airbag-integrated display according to embodiments of the present disclosure.
Figure 16:
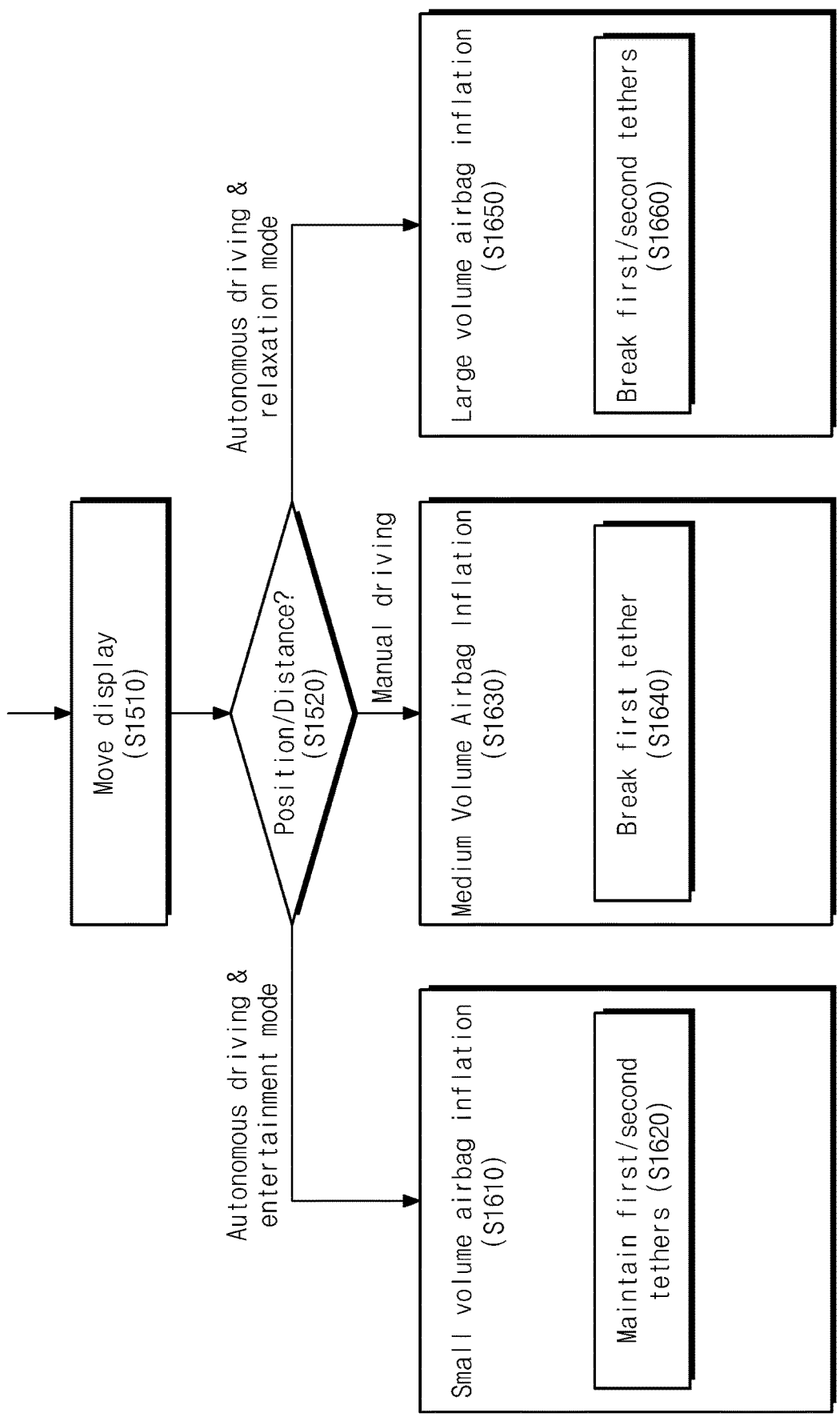

FIGS. 15 and 16 are flowcharts illustrating a method of controlling an airbag-integrated display according to embodiments of the present disclosure.

First, referring to FIG. 15, as described above, it is assumed that the display of the mobility apparatus is movable forward or backward in a driving mode (S1510). Here, the "driving mode" may be divided into an autonomous driving mode, and a manual driving mode as in the example of an autonomous vehicle. Also, the autonomous driving mode may be subdivided into an entertainment mode, a relaxation mode, and the like. Furthermore, the "driving mode" is not limited to autonomous vehicles, and may also be implemented in regular vehicles to move the display according to a stop mode, an entertainment mode, and the like.

Next, at least one of the position of the display or the distance from the driver of the mobility apparatus may be determined (S1520). The determination may be performed using the in-cabin camera in the mobility apparatus. Even in the absence of an in-cabin camera, the determination may be performed in consideration of the position of the display being moved according to the driving mode described above.

In the embodiment illustrated in FIG. 15, inflation of the slim airbag is applied in two separate stages according to at least one of the position of the display or the distance from the driver. That is, when the display is positioned retracted and/or the distance from the driver is long, the large volume airbag may be inflated (S1530). When the display is positioned protruding and/or the distance from the driver is short, the small volume airbag may be inflated (S1540).

In FIG. 16, the movement of the display (S1510) and determination of the position of the display/distance from the driver (S1520) are basically the same as in FIG. 15. However, in this embodiment, the level of airbag inflation is divided into three stages. In the autonomous driving/entertainment mode, a small volume airbag inflation is applied as stage 1 (S1610), which may be implemented by driving the inflator while maintaining both the first and second tethers as described above in relation to FIG. 6 (S1620).

Furthermore, in the manual driving mode, a medium volume airbag inflation is applied as stage 2 (S1630), which may be implemented by driving the inflator with the first tether between the first and second tethers broken as described above with reference to FIG. 7 (S1640).

Furthermore, in the autonomous driving/relaxation mode, a large volume airbag inflation is applied as stage 3 (S1650), which may be implemented by driving the inflator with both the first and second tethers broken as described above with reference to FIG. 8 (S1660).

Figure 17:
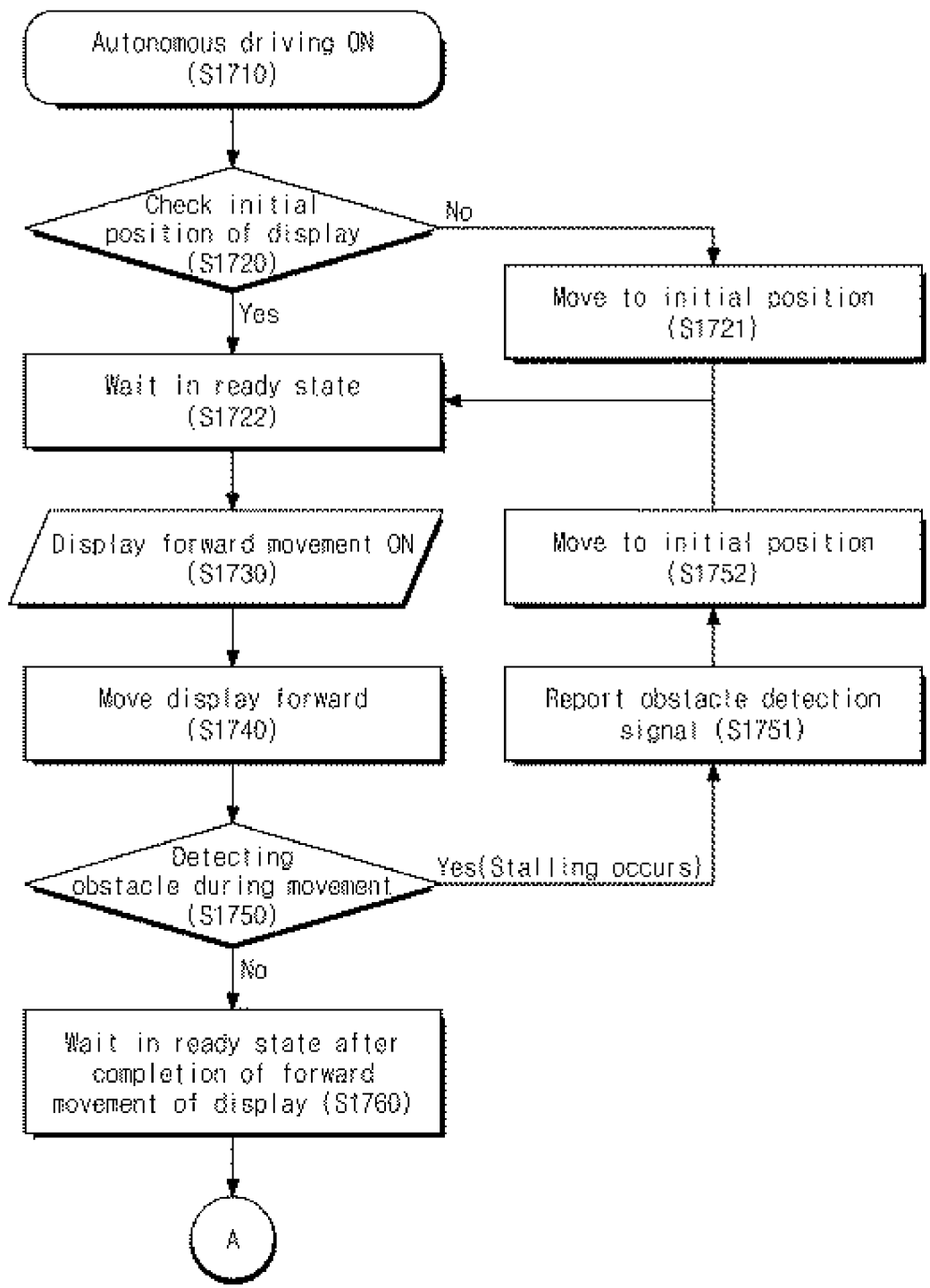
FIGS. 17 and 18 are flowcharts illustrating a control method for securing safety during movement of an airbag-integrated display according to embodiments of the present disclosure.
Figure 18:
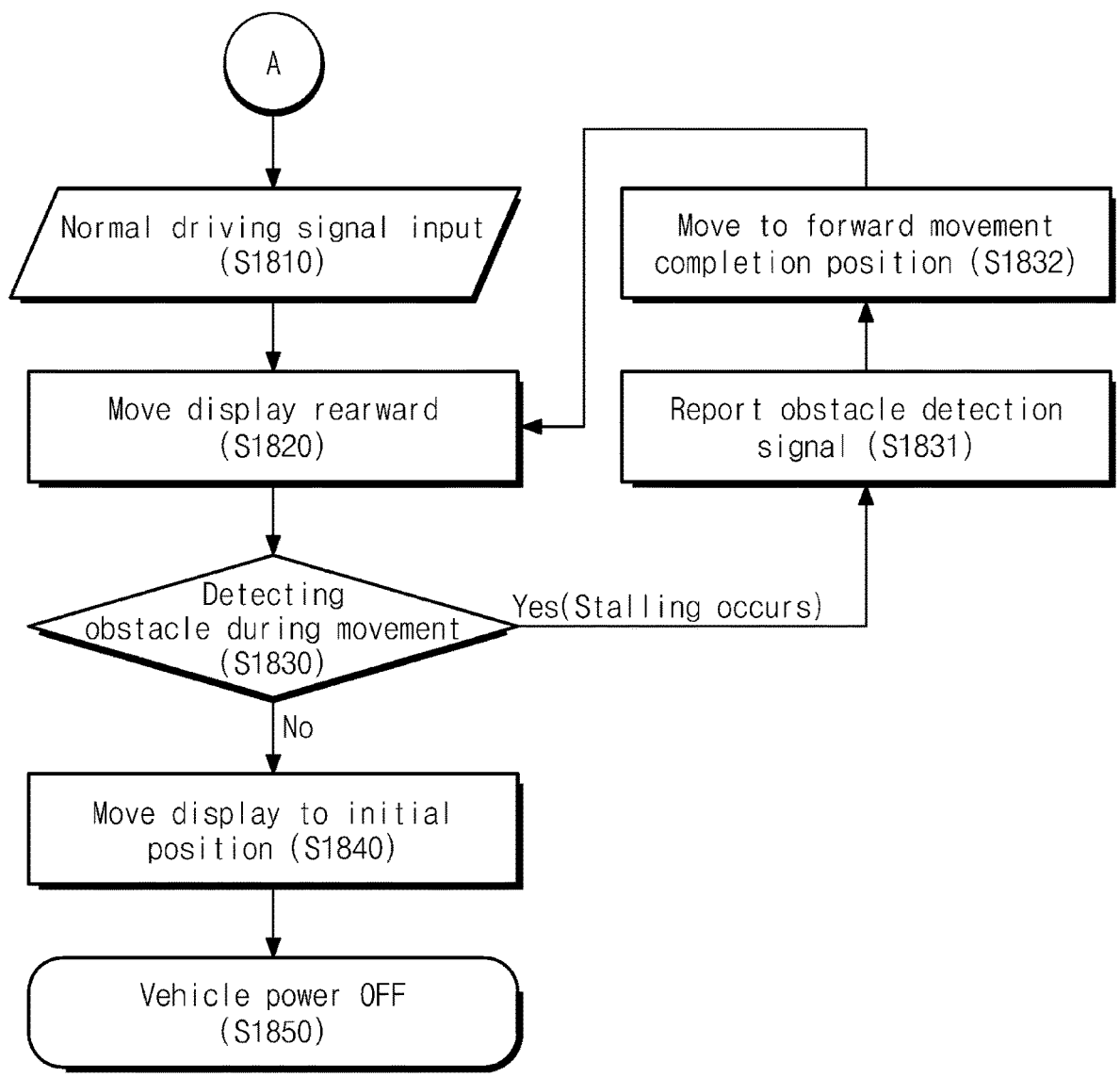

FIGS. 17 and 18 are flowcharts illustrating a control method for securing safety during movement of an airbag-integrated display according to embodiments of the present disclosure.

The control method for moving a display illustrated in FIGS. 17 and 18 may be viewed as a specific representation of the display movement S1510 of the embodiment described above with reference to FIGS. 15 and 16.

In this embodiment, the autonomous driving mode as one of the driving modes of the mobility apparatus is first switched to the ON state (S1710), and then the initial position of the display may be checked (S1720). When the airbag integrated display is located at the initial position, it may wait in a ready state (S1722). However, when it is located outside the initial position for other reasons, it may move to the initial position (S1752) and wait in the ready state (S1722).

Thereafter, the forward movement function of the display may be switched to the ON state (S1730). Accordingly, the airbag-integrated display may perform a forward movement (S1740). However, an obstacle may be detected during the forward movement of the display (S1750). For example, the presence of an obstacle, such as an occupant's arm blocking the front of the display during forward movement of the display, may cause a failure if the display continues forward movement as scheduled.

In one embodiment of the present disclosure, as a means of detecting obstacles during movement, a value of current flowing to the motor may be monitored. When current above a certain value of current is flowing to the motor, it may be determined that a stall has occurred in the motor. In the event of a motor stall, it is proposed that an obstacle detection signal be reported (S1751) and that the display be moved to the initial position (S1752) to prevent the failure described above.

In the absence of an obstacle, the display may wait in the ready state after completing the forward movement (S1760).

Referring to FIG. 18, while the display is waiting in the ready state after completing the forward movement, the driving mode of the mobility apparatus may change to a normal driving mode (S1810). Accordingly, the display according to this embodiment may initiate a rearward movement (S1820).

The display according to this embodiment may determine whether an obstacle is detected during the rearward movement in the same manner as the forward movement described above (S1830). When an obstacle is detected during the rearward movement, an obstacle detection signal may be reported (S1831), and the display may be returned to the forward pulled-out completion position (S1832).

When no obstacle is detected during the rearward movement of the display, the display may be moved back to the initial position (S1840). The operation may continue as described above until the vehicle is powered off (S1850).

As described above, a detailed description of preferred embodiments of the disclosure has been provided to enable those skilled in the art to implement and practice the disclosure. Although the disclosure has been described above with reference to preferred embodiments of the disclosure, it will be appreciated by those skilled in the art that various modifications and changes can be made to the disclosure without departing from the scope of the disclosure. For example, those skilled in the art may utilize combinations of configurations described in the embodiments above.

Accordingly, the present disclosure is not intended to be limited to the embodiments disclosed herein, but rather to give the broadest possible scope consistent with the principles and novel features disclosed herein.

As described above, embodiments of the present disclosure are usable in autonomous vehicles as well as conventional vehicles in a variety of ways to provide safety while increasing occupant comfort.

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

As disclosed above, an airbag-integrated display may include a display movable forward or rearward according to a driving mode of a mobility apparatus, a slim airbag integrally mounted to the rear of the display and moved along with the movement of the display, an odd number of rails arranged at the rear of the display for forward or rearward movement of the display, and a gear module positioned on one of left and right sides of a center rail among the odd number of rails to provide a driving force for forward or rearward movement of the display.

The slim airbag may be positioned on the other side of the left and right sides of said rails.

The slim airbag may have a thickness less than or equal to a predetermined thickness to allow space for installation of a head up display (HUD) in a cover section of the rail on the other side.

The gear module may include a rack gear, a pinion gear, and an actuator, wherein the actuator may be disposed at the lower end of the rack gear and the pinion gear.

The actuator may be arranged to be further manually movable along the one side.

The actuator may include a line contact with a frame on the one side for further manual movement toward the one side.

The pinion gear may be configured to be moved in the direction of manual movement of the actuator in the event of a failure of the actuator.

The actuator may include a motor, a reduction gear, and a controller which are integrally configured. The controller may control the motor to be driven by a first photo sensor disposed at a foremost position of the display and a second photo sensor disposed at a rearmost position.

Preferably, a guide pin may be included at the lower end of the display for position identification by the first photo sensor and the second photo sensor.

A Hall sensor may further be included inside the motor.

The Hall sensor may assist in the sensing operation in the event of a failure of one or more of the first photo sensor or the second photo sensor.

The slim airbag may be configured to vary the level of inflation of the airbag based on one or more of the position of the display or the distance from the driver of the mobility apparatus.

The odd number of rails may be determined in consideration of the safety of each inflation level when the airbag is inflated at different levels of inflation.

Each of the odd number of rails may be configured as a three-stage double slide type rail, so as to have an overlapping section even after completion of the pull-out.

According to embodiments of the present disclosure as described above, a display may be repositioned forward or backward depending on the driving mode of a mobility apparatus, and thus maximize the utilization of a large screen display beyond the utilization of the display for a mobility apparatus used in a normal driving situation, by moving to a position where full screen touch operation is possible. Accordingly, convenience may be improved.

In addition, as an integrated slim airbag is mounted on the back of the display, the safety of the occupants may be secured, contributing to extending the range for safe activities inside the autonomous mobility apparatus.

In addition, using the same airbag case or inflator module as that for the passenger airbag may contribute to cost reduction, and may replace the driver's airbag inside the steering wheel, which has been commonly used in the past, thereby maximizing the design freedom of the steering wheel.

Furthermore, by varying the level of inflation based on one or more of the position of the display or the distance from the driver of the mobility apparatus, safety may be tailored to the occupant's situation.

Furthermore, in implementing an airbag-integrated moving display, space efficiency and safety with respect to other components, such as a head-up display (HUD) disposed in the front of a mobility apparatus, may be secured.

In addition, convenience for after-sales service may be provided in case of failure of the actuator of the airbag-integrated display.

In addition, when regulated to be used only in a stopped state, the display is applicable to non-autonomous manually driven vehicles and may provide a new airbag layout suitable for the autonomous driving era, replacing the conventional driver's seat airbag.

To address the problems described above, one aspect of the present disclosure is to provide a technique for securing the comfort and safety of an occupant by integrally mounting a slim airbag behind a display when the display is movable to a forward or rearward position depending on the driving mode of a mobility apparatus.

Further, a slim airbag implemented to vary the level of inflation of the airbag based on at least one of the position of the display or the distance from the driver of the mobility apparatus is proposed.

Furthermore, the present disclosure proposes techniques for securing space efficiency and safety with respect to other components disposed in front of a mobility apparatus when implementing an airbag-integrated moving display.

In addition, a structure that considers the convenience of after-sales service in case of actuator failure of the airbag integrated display is proposed above.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An airbag-integrated display comprising:
   a display movable to a forward or rearward position according to a driving mode of a vehicle; and
   an airbag mounted on the display and being configured to move along with a movement of the display, and vary a level of inflation of the airbag based on at least one of a position of the display or a distance of the display from a driver of the vehicle.

2. The airbag-integrated display of claim 1, wherein:
   a volume of inflation of the airbag is lesser than a threshold, in response to the display being in the forward position,
   the volume of inflation of the airbag is greater than the threshold, in response to the display being in the rearward position.

3. The airbag-integrated display of claim 1, wherein:
   a volume of inflation of the airbag is lesser than a threshold, in response to the display being in the forward position and a seat of the driver not being reclined,
   the volume of inflation of the airbag is greater than the threshold, in response to the display being in the rearward position or the display being in the forward position and the seat of the driver being reclined.

4. The airbag-integrated display of claim 1, wherein the airbag comprises a first tether having a first length and a second tether having a length greater than the first length, the first tether and second tether being disposed inside a cushion,
   wherein at least one of the first tether or the second tether is configured to be broken sequentially, based on the at least one of the position of the display or the distance from the driver of the vehicle.

5. The airbag-integrated display of claim 4, wherein:
the airbag is configured to maintain the first tether and the second tether, in response to the position of the display or the distance from the driver of the vehicle being within a first range,
the airbag is configured to break the first tether, in response to the position of the display or the distance from the driver of the vehicle being within a second range larger than the first range, and
the airbag is configured to break both the first tether and the second tether, in response to the position of the display or the distance from the driver of the vehicle being within a third range larger than the second range.

6. The airbag-integrated display of claim 4, wherein the airbag comprises:
an inflator; and
an active adaptive unit (AAU),
wherein the AAU is configured to sequentially break at least one of the first tether or the second tether, based on the at least one of the position of the display or the distance from the driver of the vehicle.

7. The airbag-integrated display of claim 1, further comprising:
rails, an actuator, and a gear being provided at a rear of the display for forward or backward movement of the display.

8. The airbag-integrated display of claim 7, wherein a thickness of the airbag is less than or equal to a predetermined thickness sufficient to provide installation space for a head-up display (HUD) in a cover section of the rails.

9. The airbag-integrated display of claim 8, wherein the gear and the actuator are disposed at a position that is offset from a center of the display, the airbag not being disposed at the offset position.

10. The airbag-integrated display of claim 7, further comprising:
a position sensor arranged at the rear of the display according to a side on which the gear is disposed,
wherein the actuator is configured to control a motor drive of the actuator based on the position sensor.

11. The airbag-integrated display of claim 7, wherein:
the vehicle is an autonomous vehicle,
the display is moved from an initial position to a forwardly pulled-out position, in response to the autonomous vehicle being in an autonomous driving mode, and
the display is moved rearward from the pulled-out position to the initial position, in response to the autonomous vehicle being in a manual driving mode.

12. The airbag-integrated display of claim 11, wherein the display is configured to return to the initial position or the pulled-out position, in response to an obstacle being detected during forward or rearward movement of the display.

13. The airbag-integrated display of claim 11, wherein a steering wheel of the autonomous vehicle is accommodated in a storage space below the display, in response to the autonomous vehicle being in an autonomous driving mode.

14. A processor-implemented method of controlling an airbag-integrated display, the method comprising:
moving a display forward or rearward based on a driving mode of a vehicle;
determining at least one of a position of the display or a distance of the display from a driver of the vehicle; and
applying a different level of inflation of an airbag mounted to the rear of the display based on the at least one of the position of the display or the distance of the display from the driver of the vehicle, the airbag being moved along with a movement of the display.

15. The method of claim 14, wherein the applying of the different level of inflation comprises:
inflating the airbag with a volume lesser than a threshold, in response to the display being in a forward position; and
inflating the airbag with a volume greater than the threshold, in response to the display being in a rearward position.

16. The method of claim 14, wherein the applying of the different level of inflation comprises:
inflating the airbag with a volume lesser than a threshold, in response to the display being in a forward position and a seat of the driver not being reclined; and
inflating the airbag with a volume greater than the threshold, in response to the display being in a rearward position or the display being in the forward position and the seat of the driver being reclined.

17. The method of claim 14, wherein the airbag comprises a first tether having a first length and a second tether having a length greater than the first length, the first tether and second tether being disposed inside a cushion,
wherein the applying of the different level of inflation comprises:
sequentially breaking at least one of the first tether or the second tether based on the at least one of the position of the display or the distance from the driver.

18. The method of claim 17, wherein the applying of the different level of inflation comprises:
maintaining the first tether and the second tether, in response to the position of the display or the distance from the driver of the vehicle being within a first range;
breaking the first tether, in response to the position of the display or the distance from the driver of the vehicle being within a second range larger than the first range; and
breaking both the first tether and the second tether, in response to the position of the display or the distance from the driver of the vehicle being within a third range larger than the second range.

19. The method of claim 17, wherein the sequential breaking of the at least one of the first tether or the second tether is performed by an active adaptive unit (AAU) of the airbag.

20. The method of claim 14, wherein the vehicle is an autonomous vehicle,
wherein the moving of the display forward or rearward comprises:
moving the display from an initial position to a forwardly pulled-out position, in response to the autonomous vehicle being in an autonomous driving mode; and
moving the display rearward from the pulled-out position to the initial position, in response to the autonomous vehicle being in a manual driving mode.

* * * * *